US007804990B2

(12) United States Patent
Kiraly et al.

(10) Patent No.: US 7,804,990 B2
(45) Date of Patent: Sep. 28, 2010

(54) SYSTEM AND METHOD FOR LABELING AND IDENTIFYING LYMPH NODES IN MEDICAL IMAGES

(75) Inventors: Atilla Peter Kiraly, Plainsboro, NJ (US); Li Zhang, Skillman, NJ (US); Carol L. Novak, Newton, PA (US); Lutz Gündel, Erlangen (DE)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 923 days.

(21) Appl. No.: 11/624,746

(22) Filed: Jan. 19, 2007

(65) Prior Publication Data
US 2007/0237373 A1 Oct. 11, 2007

Related U.S. Application Data

(60) Provisional application No. 60/762,029, filed on Jan. 25, 2006.

(51) Int. Cl.
*G06K 9/00* (2006.01)

(52) U.S. Cl. .................... 382/128; 382/130; 382/131; 382/132

(58) Field of Classification Search .............. 382/128, 382/130, 131, 132
See application file for complete search history.

(56) References Cited

U.S. PATENT DOCUMENTS 6,829,379 B1 * 12/2004 Knoplioch et al. .......... 382/131
7,225,011 B2 * 5/2007 Mielekamp ................ 600/407
2003/0172043 A1 * 9/2003 Guyon et al. ............... 706/48

OTHER PUBLICATIONS

J.P. Ko, E.A. Drucker, J.A. Shepard, C.F. Mountain, C. Dresler, B. Sabloff, and T.C. McLoud, "CT depiction of regional nodal stations for lung cancer staging," AJR Am J Roentgenol. Mar. 2000;174(3):775-82.
S. Aquino, M. Harisinghani, and B. Branstetter, "Lymph Node Anatomy and Imaging for Cancer Staging," RSNA 2005. (Abstract Only).
D.M. Honea, Y. Ge, W.E. Snyder, P.F. Hemler, and D.J. Vining, "Lymph node segmentation using active contours," SPIE Medical Imaging 1997: Image Processing, vol. 3034. (1997), p. 265-273.
J. Dornheim, H. Seim, B. Preim, I. Hertel, and G. Strauss, "Segmentation of Neck Lymph Nodes in CT Datasets with Stable 3D Mass-Spring Models," Medical Image Computing and Computer-Assisted Intervention— MICCAI 2006, vol. 4191/2006, pp. 904-911.
G. Unal, G. Slabaugh, A. Ess, A. Yezzi, T. Fang, J. Tyan, M. Requardt, R.Krieg, R.Seethamraju, M. Harisinghani, and R. Weissleder, "Semi-Automatic Lymph Node Segmentation in LN-MRI," Proceedings of the IEEE Int. Conf. Image Processing, 2006.

(Continued)

*Primary Examiner*—John B Strege

(57) ABSTRACT

A method for assigning a lymph node in a medical image with an anatomical name, the method including: identifying landmarks in a medical image; computing features relative to the landmarks given a location of a lymph node in the medical image; and assigning an anatomical name to the location of the lymph node by using a classifier that compares the computed features with classification rules.

20 Claims, 10 Drawing Sheets

OTHER PUBLICATIONS

K. Mori, J. Hasegawa, Y. Suenaga, J. Toriwaki, "Automated anatomical labeling of the bronchial branch and its application to the virtual bronchoscopy system," *IEEE Transaction in Medical Imaging*, vol. 19, No. 2, Feb. 2000, p. 103-114.

J. Tschirren, G. McLennan, K. Palágyi, E.A. Hoffman, and M. Sonka, "Matching and anatomical labeling of human airway tree," *IEEE Transactions in Medical Imaging*, vol. 24, No. 12, Dec. 2005, p. 1540-1547.

J. Kaftan, A.P. Király, D.P. Naidich, C.L. Novak, "A Novel Multi-Purpose Tree and Path Matching Algorithm with Application to Airway Trees," SPIE Medical Imaging 2006, vol. 6143 (2006).

J.J. Nappi, A.H. Dachman, H. Abraham, P. MacEneaney, H. Yoshida, "Automated Knowledge-Guided Segmentation of Colonic Walls for Computerized Detection of Polyps in CT Colonography," *Journal of Computer Assisted Tomography*, 26(4):493-504, Jul./Aug. 2002. (Abstract Only).

H. Shen, L. Liang, M. Shao, and S. Qing, "Tracing Based Segmentation for the Labeling of Individual Rib Structures in Chest CT Volume Data," MICCAI 2004, vol. 3217, p. 967-974, 2004.

A.P. Király, J.P. Helferty, E.A. Hoffman, G. McLennan, and W.E. Higgins, Three-Dimensional Path Planning for Virtual Bronchoscopy, *IEEE Transactions on Medical Imaging*, vol. 23, No. 1, Nov. 2004: p. 1365-1379.

B. Odry, A.P. Király, C.L. Novak, D.P. Naidich, and J.F. Lerallut, "Automated airway evaluation system for multi-slice computed tomography using airway lumen diameter, airway wall thickness and broncho-arterial ratio," SPIE Medical Imaging 2006, vol. 6143 (2006), p. 243-253.

S.R. Aylward and E. Bullitt, "Initialization, Noise, Singularities, and Scale in Height Ridge Traversal for Tubular Object Centerline Extraction," *IEEE Transactions in Medical Imaging*, vol. 21, No. 2. Feb. 2002.

C. Cortes and V. Vapnik, "Support-Vector Networks," *Machine Learning*, vol. 20, No. 3, 1995, p. 273-297.

J.B.A. Maintz and M. A. Viergever. "A survey of medical image registration," Medical Image Analysis 2(1), p. 1-36, 1998.

\* cited by examiner

| Nodal Grouping | Total Stations | Names |
|---|---|---|
| 1. Superior Mediastinal | 4 | Highest Mediastinal, Upper Paratracheal, Prevascular and Retrotracheal, Lower Paratracheal |
| 2. Aortic | 2 | Subaortic and Para-aortic |
| 3. Inferior Mediastinal | 3 | Inferior Mediastinal, Paraesophageal, Pulmonary Ligament |
| 4. $N_1$ | 5 | Hilar, Interlobar, Lobar, Segmental, Subsegmental |

FIG. 3

| Feature | Description |
|---|---|
| $f_0, f_1, f_2$ | The normalized vector from the carina to X |
| $f_3$ | The distance from X to the carina |
| $f_4, f_5$ | $f_4 = f_3 \times f_0$ and $f_5 = f_3 \times f_2$ |
| $f_6$ | The shortest distance from X to airway tree |
| $f_7$ | The angle from the downward vector at carina to X |
| $f_9, f_{10}, f_{11}$ | The normalized vector from the left main bifurcation to X |
| $f_{12}, f_{13}, f_{14}$ | The normalized vector from the right main bifurcation to X |
| $f_{15}$ | The distance from the left main bifurcation to X |
| $f_{16}$ | The distance from the right main bifurcation to X |
| $f_{17}$ | The distance from X to the nearest portion of the aorta |
| $f_{18}, f_{19}, f_{20}$ | The normalized vector from the nearest portion of the aorta to X |
| $f_{21}$ | The distance from X to the top of the aorta |

FIG. 7

SYSTEM AND METHOD FOR LABELING AND IDENTIFYING LYMPH NODES IN MEDICAL IMAGES

CROSS-REFERENCE TO RELATED APPLICATION

This application claims the benefit of U.S. Provisional Application No. 60/762,029, filed Jan. 25, 2006, a copy of which is herein incorporated by reference.

BACKGROUND OF THE INVENTION

1. Technical Field

The present invention relates to anatomic object labeling and identification in medical images, and more particularly, to a system and method for labeling and identifying lymph nodes in medical images.

2. Discussion of the Related Art

The identification and evaluation of lymph nodes for cancer staging forms a large portion of a radiologist's workflow. Examples of this are described in J. P. Ko, E. A. Drucker, J. A. Shepard, C. F. Mountain, C. Dresler, B. Sabloff, and T. C. McLoud, "CT depiction of regional nodal stations for lung cancer staging", AJR Am J Roentgenol. 2000 March; 174(3): 775-82, and S. Aquino, M. Harisinghani, and B. Branstetter, "Lymph Node Anatomy and Imaging for Cancer Staging", RSNA 2005. The information acquired when identifying and evaluating lymph nodes plays a central role in cancer diagnosis and treatment.

Previous approaches to automate the identification and evaluation of lymph nodes tend to focus on lymph node segmentation. Examples of this are found in D. M. Honea, Y. Ge, W. E. Snyder, P. F. Hemler, and D. J. Vining, "Lymph node segmentation using active contours", SPIE Medical Imaging 1997: Image Processing, Vol. 3034. (1997), p. 265-273, J. Dornheim, H. Seim, B. Preim, I. Hertel, and G. Strauss, "Segmentation of Neck Lymph Nodes in CT Datasets with Stable 3D Mass-Spring Models", Medical Image Computing and Computer-Assisted Intervention—MICCAI 2006, Volume 4191/2006, pp. 904-911, and G. Unal, G. Slabaugh, A. Ess, A. Yezzi, T. Fang, J. Tyan, M. Requardt, R. Krieg, R. Seethamraju, M. Harisinghani, and R. Weissleder, "Semi-Automatic Lymph Node Segmentation in LN-MRI", Proceedings of the IEEE Int. Conf. Image Processing, 2006.

The ability to segment lymph nodes provides the basis for quantitative information relating to size and shape. Such automated methods help reduce reader variability and errors, leading to more consistent measurements and assessments. Approaches that involve fast matching, directed contours, and spring-mass models have been applied along with various forms of shape priors. Although these methods show promising results, lymph node segmentation still remains a challenging task. Further, even with such tools available, radiologists must still manually provide anatomical labels for lymph nodes during staging and assessment.

Anatomical labels are assigned to groups of lymph nodes within specific regions of the body. They are critical for cancer staging since they help determine how far the cancer has spread. The labels are given to the lymph nodes depending upon their location relative to anatomical landmarks. Hence, in order to assign the proper label for a specific lymph node, the radiologist must examine the image and find these landmarks relative to the lymph node. Additionally, for follow up cases, specific lymph nodes must be found and compared to their appearance in prior scans. These requirements impact the workload of radiologists both in the time required to find nearby landmarks and in the time for adding the information within, for example, a dictation system.

Automated anatomic labeling of medical images has been used for various purposes other than lymph nodes. In the case of the airways, it has been used to label specific branches and for follow-up studies for virtual bronchoscopy. Examples of this are found in K. Mori, J. Hasegawa, Y. Suenaga, J. Toriwaki, "Automated anatomical labeling of the bronchial branch and its application to the virtual bronchoscopy system", IEEE Transaction in Medical Imaging, vol. 19, no. 2, February 2000, p. 103-114, J. Tschirren, G. McLennan, K. Palágyi, E. A. Hoffman, and M. Sonka, "Matching and anatomical labeling of human airway tree", IEEE Transactions in Medical Imaging, vol. 24, no. 12, December 2005, p. 1540-1547, and J. Kaftan, A. P. Kiraly, D. P. Naidich, C. L. Novak, "A Novel Multi-Purpose Tree and Path Matching Algorithm with Application to Airway Trees", SPIE Medical Imaging 2006, vol. 6143 (2006).

Anatomical landmark identification has been used to improve colon segmentation. An example of this is found in J. J. Nappi, A. H. Dachman, H. Abraham, P. MacEneaney, H. Yoshida, "Automated Knowledge-Guided Segmentation of Colonic Walls for Computerized Detection of Polyps in CT Colonography", Journal of Computer Assisted Tomography, 26(4):493-504, July/August 2002. Rib labeling of computed tomography (CT) datasets has been used to reduce a radiologist's workflow. An example of this is described in H. Shen, L. Liang, M. Shao, and S. Qing, "Tracing Based Segmentation for the Labeling of Individual Rib Structures in Chest CT Volume Data", MICCAI 2004, vol. 3217, p. 967-974, 2004.

In J. P. Ko, E. A. Drucker, J. A. Shepard, C. F. Mountain, C. Dresler, B. Sabloff, and T. C. McLoud, "CT depiction of regional nodal stations for lung cancer staging", AJR Am J Roentgenol. 2000 March; 174(3):775-82, it is described how lymph nodes may be divided into four major groups, e.g., superior mediastinal nodes, aortic nodes, inferior mediastinal nodes and $N_1$ nodes. FIG. 1 illustrates locations of these groups in relation to the airways and the aorta, while FIG. 2 shows marked nodal locations and airways within an actual dataset. For example, in FIG. 1(a), 1=superior mediastinal nodes, 2=aortic nodes, 3=inferior mediastinal nodes, 4=$N_1$ nodes, A=aorta, PA=pulmonary artery, and C=carina. In FIG. 1(b), some of the nodes specific to group 1 are labeled as, A=highest mediastinal, B=upper paratracheal, and C=lower paratracheal. Lymph nodes are further divided into 14 subgroups, or stations, including hilar, interlobar, lobar, and so forth as listed in a table shown in FIG. 3.

Currently, radiologists reading staging exams must identify and assess major lymph nodes to document abnormalities. The correct determination of a node's label is critical for accurate disease staging, and consequently determining the best treatment options for the patient. However, this process is time consuming and occasionally inaccurate. Accordingly, there is a need for a technique that is capable of quickly and accurately labeling lymph nodes in medical images.

SUMMARY OF THE INVENTION

In an exemplary embodiment of the present invention, a method for assigning a lymph node in a medical image with an anatomical name comprises: identifying landmarks in a medical image; computing features relative to the landmarks given a location of a lymph node in the medical image; and assigning an anatomical name to the location of the lymph node by using a classifier that compares the computed features with classification rules.

The landmarks include centerlines of airways and a centerline of an aorta. The computed features include positional vectors of the lymph node relative to locations on the landmarks. The computed features include distance values of the lymph node relative to locations on the landmarks. The classifier is a trained Support Vector Machine (SVM) that includes a model having a set of anatomical names associated with locations in the medical image defining the classification rules.

The method further comprises acquiring the medical image by using a computed tomographic (CT), magnetic resonance (MR), or ultrasound imaging technique. When assigning the anatomical name to the location of the lymph node biopsy-related information associated with the anatomical name is provided.

In an exemplary embodiment of the present invention, a system for assigning a lymph node in a medical image with an anatomical name comprises: a memory device for storing a program; a processor in communication with the memory device, the processor operative with the program to: identify landmarks in a medical image; compute features relative to the landmarks given a location of a lymph node in the medical image; and assign an anatomical name to the location of the lymph node by using a classifier that compares the computed features with classification rules.

The landmarks include centerlines of airways and a centerline of an aorta. The computed features include positional vectors of the lymph node relative to locations on the landmarks. The computed features include distance values of the lymph node relative to locations on the landmarks. The classifier is a trained SVM that includes a model having a set of anatomical names associated with locations in the medical image defining the classification rules.

The processor is further operative with the program to acquire the medical image by using a CT, MR, or ultrasound imaging technique. When assigning the anatomical name to the location of the lymph node, the processor is further operative with the program to provide biopsy-related information associated with the anatomical name.

In an exemplary embodiment of the present invention, a method for finding a region in a first medical image that contains a lymph node comprises: identifying landmarks in a first medical image; computing features relative to the landmarks for locations within an area of the first medical image and assigning the locations with anatomical names by using a classifier that compares the computed features with classification rules; and providing a region associated with a given anatomical name.

When a location and an anatomical name is obtained from the first medical image or a second medical image, the method further comprises: identifying landmarks in the second medical image; performing a registration between the landmarks of the first and second medical images; and providing the location associated with the given anatomical name in the other of the first and second medical images. The area is a portion of the first medical image determined by defining a region of interest in the first medical image.

In an exemplary embodiment of the present invention, a method for determining a label of a lymph node in a medical image comprises: identifying landmarks in a medical image; and visualizing the landmarks along with a given object location for manual interpretation of a label of a lymph node in the medical image.

In an exemplary embodiment of the present invention, a method for assigning a structure in a medical image with a label comprises: identifying landmarks in the medical image; computing features relative to the landmarks of the medical image given a location of a structure in the medical image; and assigning a label to the location of the structure by using a classifier that compares the computed features with classification rules.

The computed features are spatial and relative to the landmarks, intensity values of the anatomical locations or models of structures within the medical image. The structure is a lymph node.

In an exemplary embodiment of the present invention, a method for assigning a lymph node in a medical image with an anatomical name comprises: identifying landmarks in a medical image; computing features relative to the landmarks given a location of a lymph node in the medical image; and assigning an anatomical name to the location of the lymph node by using the computed features.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 3 illustrates a table of chest lymph nodes categorized by grouping and station;

FIG. 7 illustrates features for characterizing lymph node locations according to an exemplary embodiment of the present invention;

DETAILED DESCRIPTION OF EXEMPLARY EMBODIMENTS

A system for labeling and identifying lymph nodes in medical images according to an exemplary embodiment of the present invention will now be described.

Figure 4:
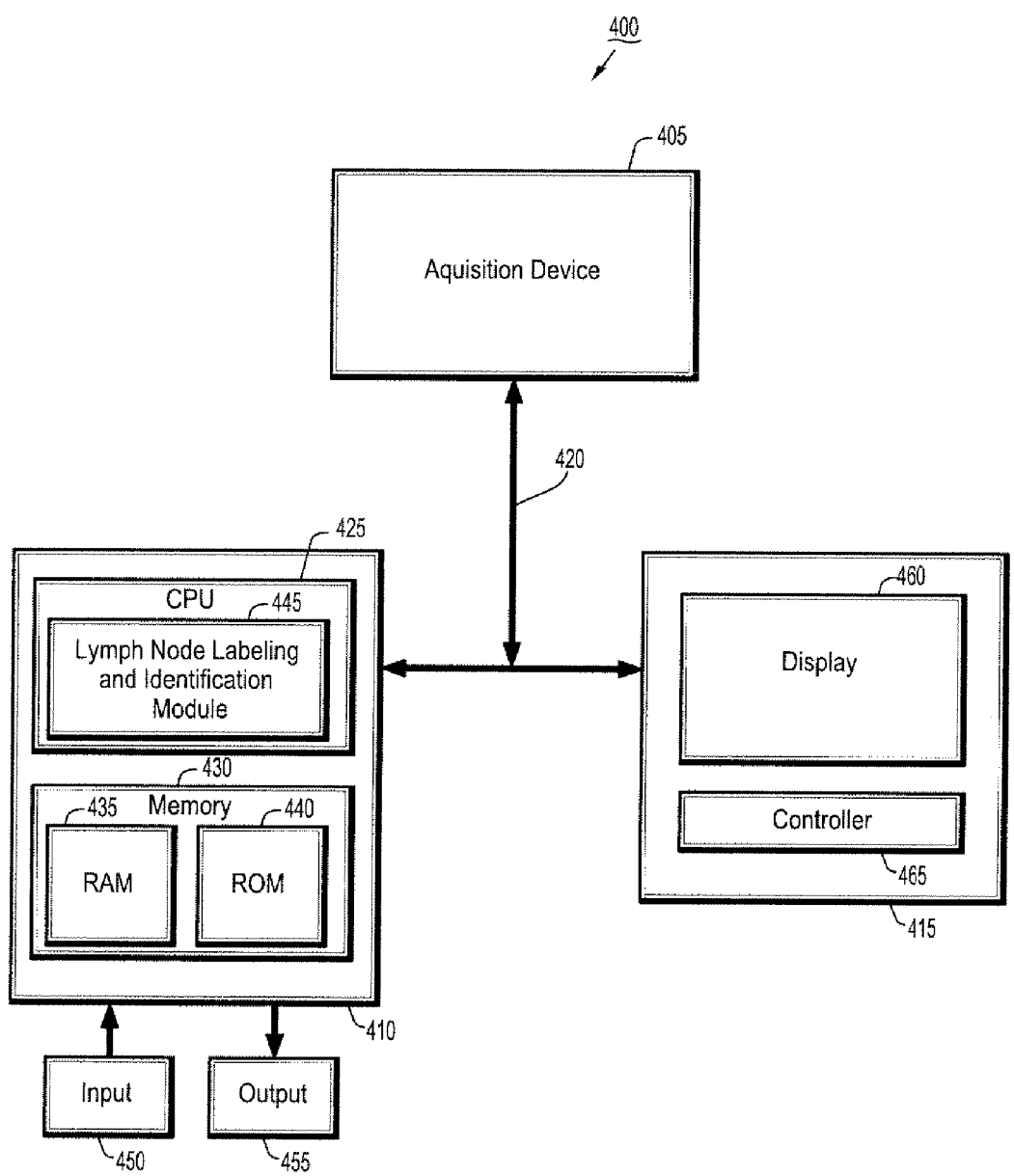
FIG. 4 illustrates a system for labeling and identifying lymph nodes in medical images according to an exemplary embodiment of the present invention.

FIG. 4 illustrates a system 400 for labeling and identifying lymph nodes in medical images according to an exemplary embodiment of the present invention. As shown in FIG. 4, the system 400 includes an acquisition device 405, a personal computer (PC) 410 and an operator's console 415 connected over a wired or wireless network 420.

The acquisition device 405 may be a computed tomography (CT) imaging device or any other three-dimensional (3D) high-resolution imaging device such as a magnetic resonance (MR) scanner or ultrasound scanner.

The PC 410, which may be a portable or laptop computer, a medical diagnostic imaging system or a picture archiving communications system (PACS) data management station, includes a central processing unit (CPU) 425 and a memory 430 connected to an input device 450 and an output device 455. The CPU 425 includes a lymph node labeling and identification module 445 that includes one or more methods for labeling and identifying lymph nodes in medical images to be discussed hereinafter with reference to FIGS. 5-10. Although shown inside the CPU 425, the lymph node labeling and identification module 445 can be located outside the CPU 425.

The memory 430 includes a random access memory (RAM) 435 and a read-only memory (ROM) 440. The memory 430 can also include a database, disk drive, tape drive, etc., or a combination thereof. The RAM 435 functions as a data memory that stores data used during execution of a program in the CPU 425 and is used as a work area. The ROM 440 functions as a program memory for storing a program executed in the CPU 425. The input 450 is constituted by a keyboard, mouse, etc., and the output 455 is constituted by a liquid crystal display (LCD), cathode ray tube (CRT) display, printer, etc.

The operation of the system 400 can be controlled from the operator's console 415, which includes a controller 465, e.g., a keyboard, and a display 460. The operators console 415 communicates with the PC 410 and the acquisition device 405 so that image data collected by the acquisition device 405 can be rendered by the PC 410 and viewed on the display 460. The PC 410 can be configured to operate and display information provided by the acquisition device 405 absent the operator's console 415, by using, e.g., the input 450 and output 455 devices to execute certain tasks performed by the controller 465 and display 460.

The operator's console 415 may further include any suitable image rendering system/tool/application that can process digital image data of an acquired image dataset (or portion thereof) to generate and display images on the display 460. More specifically, the image rendering system may be an application that provides rendering and visualization of medical image data, and which executes on a general purpose or specific computer workstation. The PC 410 can also include the above-mentioned image rendering system/tool/application.

A method for labeling and identifying lymph nodes in medical images according to an exemplary embodiment of the present invention will now be described.

Figure 5:
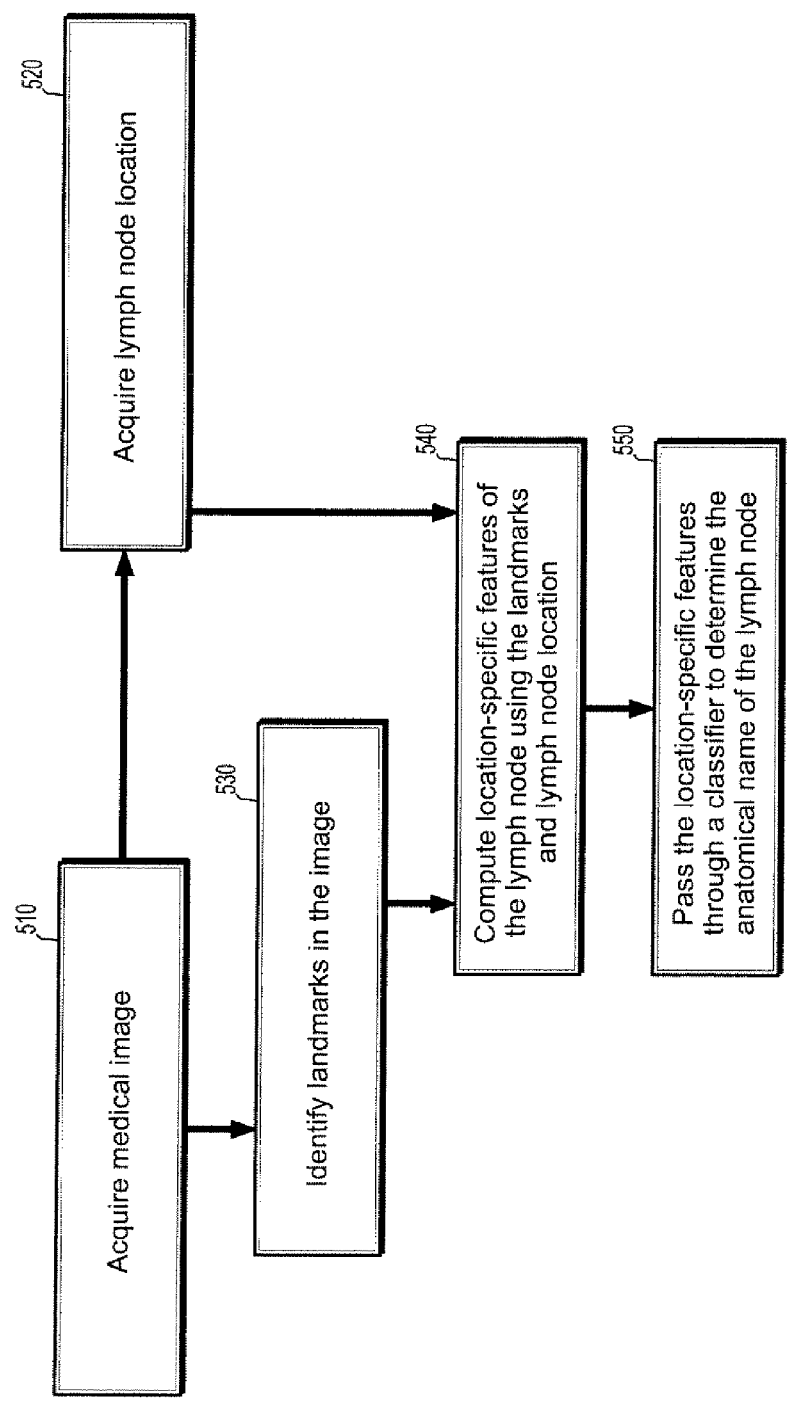
FIG. 5 illustrates a method for labeling and identifying lymph nodes in medical images according to an exemplary embodiment of the present invention.

FIG. 5 illustrates a method for labeling and identifying lymph nodes in medical images according to an exemplary embodiment of the present invention. Briefly, as shown in FIG. 5, a 3D image of a patient's chest is acquired (510). Once acquired, a lymph node location (e.g., marked by a radiologist) within the 3D image is given (520). The 3D image is preprocessed and certain landmarks such as centerlines of the patient's airways and aorta are identified (530). Next, the centerlines are used to compute features in spatial relation to the location of the given lymph node (540). The computed features are then used in a classifier to determine the proper label for the node (550).

This method will now be discussed in detail. It is to be understood that although the following discussion will focus on labeling and identifying lymph nodes in the chest near the airways and aorta, this method and/or a variation thereof can be used to label and identify lymph nodes such as those located in the abdomen near the colon, or to label and identify other anatomical structures encompassing both geometric and non-geometric features.

For the following discussion, the original chest volume is referred to as I, and the selected lymph node location is referred to as $x \in I$, where $x=(x, y, z)$ defines a 3D location with the image. The assigned label, $L \in \{s_1, s_2, \ldots, s_{14}\}$ is one of 14 possible stations listed in the table of FIG. 3. Additional notation is introduced as needed. In summary, the application of the method to be discussed is to determine the proper $L \in \{s_1, s_2, \ldots, s_{14}\}$ given the location $x \in I$.

Figure 6:
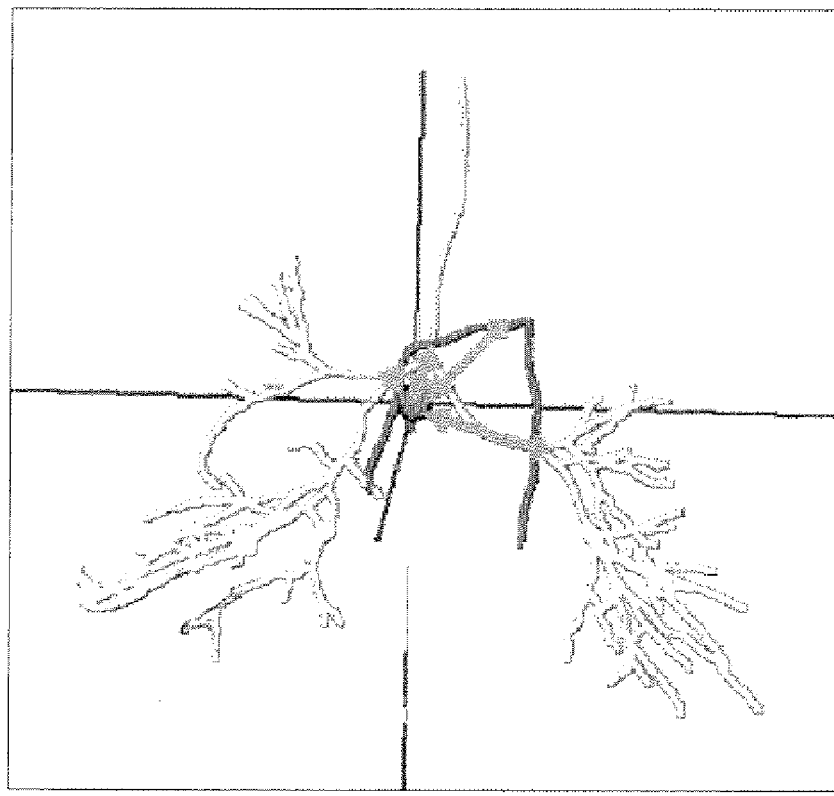
FIG. 6 illustrates centerlines obtained for airways and an aorta along with a lymph node location and feature vectors according to an exemplary embodiment of the present invention.

With regard to step 530, in order to collect spatial features, landmarks must first be acquired within the image I. The airways and the aortic arch are used as landmarks, since the majority of the lymph nodes within the chest lie along these structures. Tree structure models are used to represent these landmarks. In general, a tree structure $T=(V, B, P)$ is composed of sets of viewing sites V, branches B, and paths P. Each branch is composed of a series of viewing sites, while each path is comprised of a series of branches. This is a hierarchical structure with a special branch $b_1 \in B$ known as the root branch. All paths start at this branch. A description of this tree structure model is found in A. P. Kiraly, J. P. Helferty, E. A. Hoffman, G. McLennan, and W. W. Higgins, Three-Dimensional Path Planning for Virtual Bronchoscopy, IEEE Transactions on Medical Imaging, vol. 23, no. 1, November 2004: p. 1365-1379, a copy of which is incorporated by reference herein in its entirety. The airway tree model is referred to as $T_{AIR}$ and an aorta arch model is referred to as $T_{AORTA}$. The case is simpler for the aortic arch since there are no bifurcations, in which case there is a single path and single branch containing all sites. FIG. 6 illustrates the centerlines for both of these structures.

The airway centerlines are obtained by first performing an adaptive region growing segmentation starting at the trachea. An example of this is found in B. Odry, A. P. Kiraly, C. L. Novak, D. P. Naidich, J. F. Lerallut, "Automated airway evaluation system for multi-slice computed tomography using airway lumen diameter, airway wall thickness and broncho-arterial ratio", SPIE Medical Imaging 2006, vol. 6143 (2006), p. 243-253, a copy of which is incorporated by reference herein in its entirety. Next, the segmented image is skeletonized and refined to create the structure $T_{AIR}$. The skeletonization and refinement process is described in A. P. Kiraly, J. P. Helferty, E. A. Hoffman, G. McLennan, and W. W. Higgins, Three-Dimensional Path Planning for Virtual Bronchoscopy, IEEE Transactions on Medical Imaging, vol. 23, no. 1, November 2004: p. 1365-1379. Three sites within this structure are identified, e.g., the carina and the bifurcation points of the left and right main bronchi. These sites are determined automatically by examining the divergence of the paths into different regions of the lungs. For example, the divergence of the two paths leading to the left-most and the right-most regions of the lungs determine the carina.

Next, the aorta model $T_{AORTA}$ is created by use of a simplified ridge transversal method. Various methods are available for ridge transversal to define centerlines of tubular objects. An example method is described in S. R. Aylward and E. Bullitt, "Initialization, Noise, Singularities, and Scale in Height Ridge Traversal for Tubular Object Centerline Extraction", IEEE Transactions in Medical Imaging, vol. 21, no. 2, February 2002, a copy of which is incorporated by reference herein in its entirety. The methods operate by starting at a location and continue to add points, while detecting bifurcations and adjusting to different scales. In this situation, the aorta is relatively large and contains no bifurcations, thus making the model easier to create. Ridges within the mediastinal region are emphasized by applying a filter to detect vessels based on first-order derivatives of the image. The starting location is chosen as the location with the greatest ridge intensity located behind the carina. This location is then tracked upwards until it returns to the same transverse slice where the tracking started. It is to be understood that any other method for defining the aorta centerline can be used as well. The highest point of the aorta model is also marked for use in later feature computations.

Once the models are determined for an image volume, positional features can be computed. It is to be understood that the above-described step is done only once per volume as it is independent of the given location X. The features for other locations within the same image volume can be quickly computed and the remaining classification steps require negligible amounts of time. FIG. 6 demonstrates the centerline models obtained for the airways and the aorta along with an example location and example features.

With regard to step 540, all features collected involve positional information relating X to the centerline models $T_{AIR}$ and $T_{AORTA}$. These features are numerical values encoding vectors, distances, and angles, or any other spatial feature. Distance computations are Euclidean distance values computed between X and a chosen point. This point can be either a predefined point such as the carina, or a point within the centerline model closest to X. Vectors computed between two points are normalized and encoded as three features. One feature is the angle measured between a downward facing (e.g., toward the patient's feet) vector located at the carina and the vector between the carina location and the location X. An exemplary set of collected features for analysis is listed in a table shown in FIG. 7. Distance-based features can be normalized from zero to one based upon the values obtained in the sample set of images from which these features are collected. Since the features listed in the table of FIG. 7 are purely spatial, applying the method to different imaging modalities only requires changing the method of acquiring the centerline models. Hence, application to non-contrast CT data as well as MR data is attainable.

With regard to step 550, once the features are collected from the given lymph node location, they are used to produce a label. A Support Vector Machine (SVM) with a Radial Basis Function is used to examine and process the features. An example of the concept of an SVM is found in C. Cortes and V. Vapnik, "Support-Vector Networks", Machine Learning, vol. 20, no. 3, 1995, p. 273-297, a copy of which is incorporated by reference herein in its entirety. The SVM is trained to produce a model, and that model is used to assign the proper label for nodes in any new image volumes. It is to be understood that the SVM is only used to partition the image space into different regions based upon the landmarks. Since these features are positional and intuitive, a Bayesian classifier can also be designed directly from a radiologist's rules. It is to be understood that any suitable method for classifying features can be used in this step.

Figure 8:
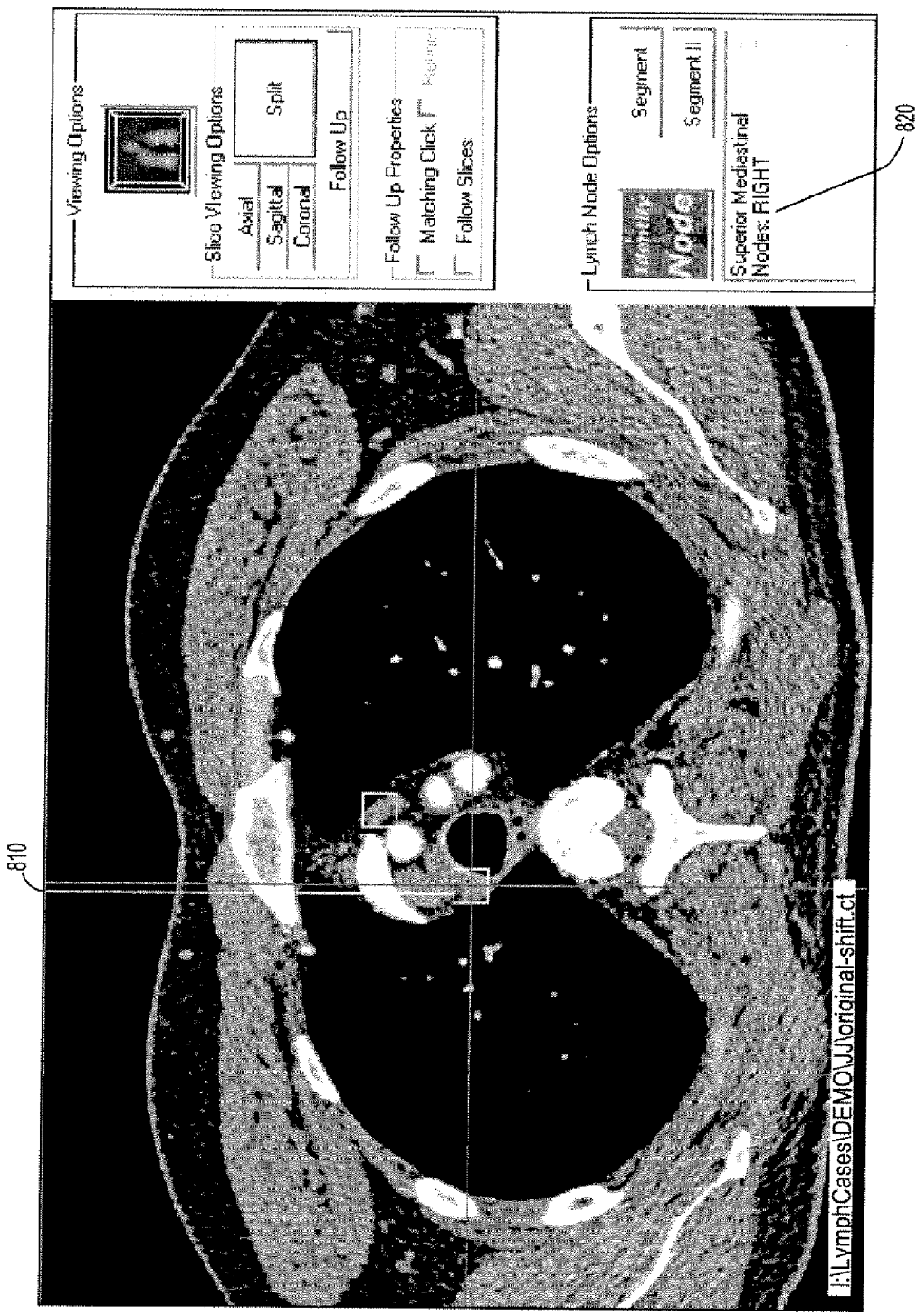
FIG. 8 illustrates a screen-shot of a system for labeling and identifying lymph nodes in medical images according to an exemplary embodiment of the present invention.

FIG. 8 illustrates a screen-shot of a system for labeling and identifying lymph nodes in medical images according to an exemplary embodiment of the present invention. Here, a node location 810 is selected by a physician, and once the node location 810 is selected, the system undergoes the processes described above with reference to FIG. 5 and displays an anatomical name 820 of the node location 810. The anatomical name 820 is given instantaneously with the selection of the node location 810.

Figure 9:
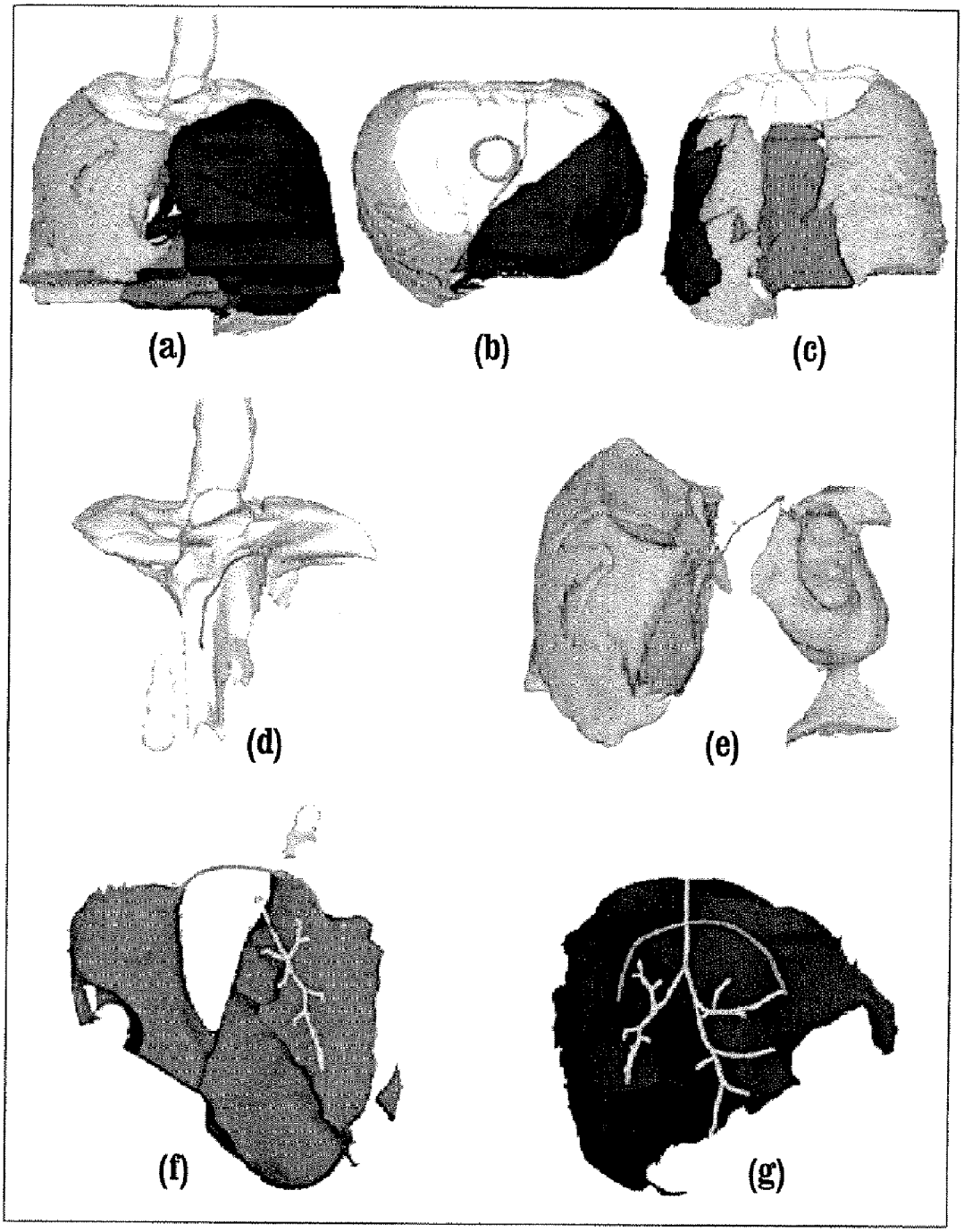
FIG. 9 illustrates decision regions for four major lymph node groups visualized according to an exemplary embodiment of the present invention.

In an exemplary implementation of the present invention, the SVM was trained on a collection of images shown in FIG. 9. The use of all the features can be undesirable since it may over-train the classifier to the initial datasets. Hence, a subset of optimal features was determined by examining all possible combinations of subsets in creating a model. This was done by testing and training on the same datasets. It is to be understood that any suitable method for determining optimal features can be used in this step. Once a subset was found, it was used to perform a round-robin evaluation of the data. In this evaluation, the classifier trained on all the data except one image. This process was then repeated for all images and the total results were recorded.

In order to visualize the decision regions of the method, each voxel within the lung and heart region of the image was labeled with an output label as shown in FIG. 9. In this case, only the nodal groups are shown. Here, all voxels within the area near the lungs and trachea were labeled and then visualized according to the label. The groups are represented by gray shading according to the following: WHITE—superior mediastinal, LIGHT GRAY—$N_1$, DARK GRAY—inferior mediastinal, BLACK—aortic. Images (a) through (c) show various view of all the regions. Images (d) through (g) show the individual regions along with the airway and aorta centerlines for reference.

It is to be understood that this visualization can serve as a tool for a better intuition of the method as well for determining the characteristics of the classifier and model. For example, the views of each decision region group help to detect possible overtraining or the requirements of additional landmarks or features, since it is possible that one or more additional landmarks may be necessary to correct consistent errors in similar locations. They can also help in deciding which landmarks would be the most beneficial. Further, they can be used as a tool for locating new correlations between the chosen landmarks and assigned labels to simplify existing label descriptions.

Figure 10:
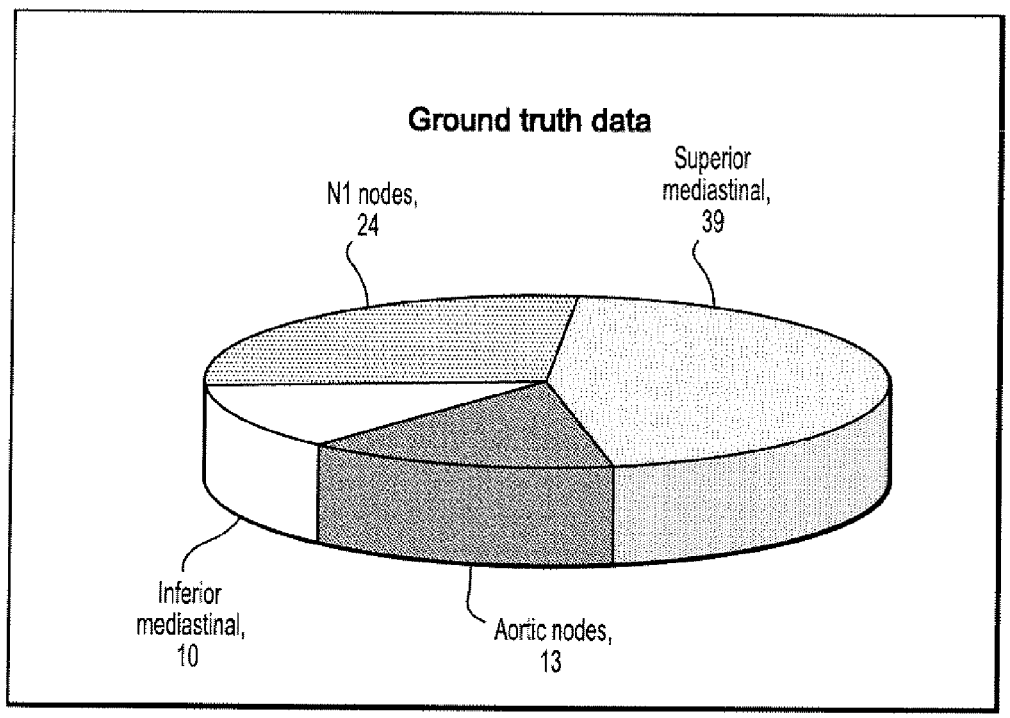
FIG. 10 illustrates a pie chart of initial ground truth test data consisting of lymph nodes divided by nodal grouping according to an implementation of an exemplary embodiment of the present invention.

In the exemplary implementation, the method and features were evaluated using ten contrast enhanced CT datasets. Scans were acquired with a Siemens Sensation 16 CT scanner, 0.75 mm collimation, and 0.75 mm sections reconstructed every 0.5 mm. An experienced radiologist marked and labeled visible lymph nodes within each image. A total of 86 lymph node locations were marked. FIG. 10 displays a pie chart of the marked nodes divided by nodal grouping. This data was used to evaluate the features $f_0$ through $f_{21}$.

Each image was automatically processed to acquire the landmarks. The features $f_0$ through $f_{21}$ were then computed for each of the marked and labeled lymph nodes. In order to evaluate the features, an exhaustive search of all possible feature combinations was used for training and testing the classifier. Eight features were determined to be sufficient for good discrimination. A larger number of features resulted in similar accuracy. Again, a lower number of features can reduce the possibility of over-training. The selected features underwent round-robin testing and provided 100% correctness for the group classification and 76% correctness for the station labels.

The eight features chosen were: $f_6$, $f_{10}$, $f_{12}$, $f_{15}$, $f_{18}$, $f_{19}$, $f_{20}$, $f_{21}$. The first five features relate to the airways, while the remaining three are related to the aorta. This result indicates that both are important landmarks. Other combinations of features also produced similar results with a similar mix of information from both landmarks.

Figure 1:
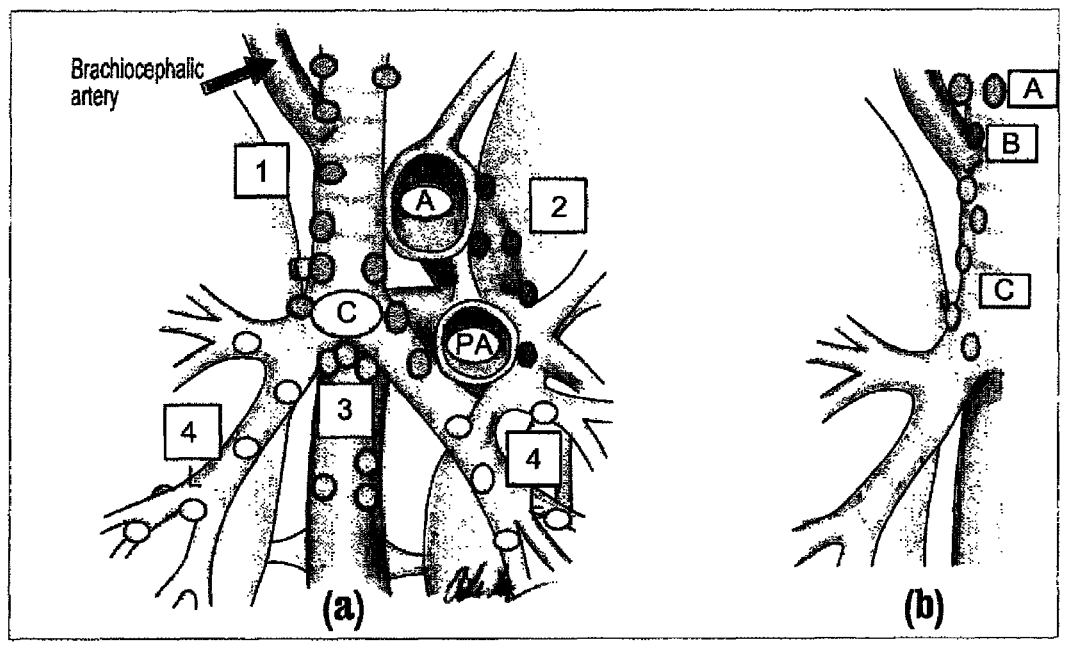
FIG. 1 illustrates nodal stations for lung cancer staging in relation to major anatomical structures.

It was also determined that feature $f_7$, which is an angle measurement based on the location X and the carina, was the most useful single feature when used individually. It resulted in 78% accuracy for group labeling and 48% for station labels. It is to be understood that FIG. 1 provides intuition for why this result was achieved. The major groupings tend to be roughly demarcated by the carina; however, the same cannot be said for the station labels.

In accordance with exemplary embodiments of the present invention, a system and method for automated lymph node labeling within the chest for improving the process of lung cancer staging have been presented. Since lymph nodes tend to follow the vessels and linear structures along most of the body, these same concepts can be used to expand the system and method to other regions of the body. Additionally, since the centerline description of major anatomical landmarks present a low overhead for feature generation, the system and method does not require great processing power or memory capabilities to run.

As previously mentioned, the initial results of 100% group and 76% nodal station accuracies are promising. This was achieved by only using the eight features from the two centerline landmarks. Further improvements are contemplated given additional datasets, feature analysis, and possibly one or two additional landmarks. For example, the brachiocephalic artery appears to be a promising candidate to use as a landmark, especially for sub-dividing the superior mediastinal nodes. This landmark is described in J. P. Ko, E. A. Drucker, J. A. Shepard, C. F. Mountain, C. Dresler, B. Sabloff, and T. C. McLoud, "CT depiction of regional nodal stations for lung cancer staging", AJR Am J Roentgenol. 2000 March; 174(3):775-82, a copy of which is incorporated by reference herein in its entirety. For the purposes of lung cancer staging, the final staging score is more dependant upon the lymph node group than the actual station label. Hence, if an abnormal node is classified into the incorrect station, but the correct nodal group, then staging may not be affected. This situation is especially true for the $N_1$ group of nodes. Hence, although this particular implementation of the invention may not have perfect results with regard to the nodal stations, it may still aid in lung cancer staging.

The nodal group decision regions in FIG. 9 show that the individual groups are constrained to more or less solid regions. Although not for certain, this suggests that the classifier is not over-trained. As more data is available, any changes in the decision surfaces will reveal possible over-training. It is noted that in images (d) through (g) of FIG. 9 the airway and aorta centerlines are rendered to show their influence on the decision surfaces. The decision surfaces can be used as a tool for determining specific locations of errors within the labeling method. It can also be used to determine if additional features are necessary depending upon the results with new datasets and the location of any labeling errors.

Several alternative embodiments of the present invention will now be discussed. First, the use of additional landmarks can be used to improve the accuracy for the nodal station labels. Further, as stated earlier, once the features and landmarks are chosen, applying the method to images of different modalities can be accomplished by modifying the method used to extract the landmarks. It is to be noted that the previous statement only applies to situations where purely spatial features were used. For non-contrast CT data, this entails designing an alternative method to identify the aorta centerline. In the case of MR data, a new method to acquire the airway segmentation may be needed as well. All other steps could remain exactly the same.

Another alternative embodiment is to provide biopsy-related information along with the anatomical name of the lymph node. While this typically necessitates markedly different approaches depending on the precise location of the nodes, including transbronchial and/or transthoracic needle aspiration/biopsy, mediastiniscopy and thoracotomy, indications for the use of these procedures is often not known by interpreting radiologists. Supplying this information to the radiologist directly at the time of labeling can allow for more informed decisions regarding staging and treatment.

Figure 2:
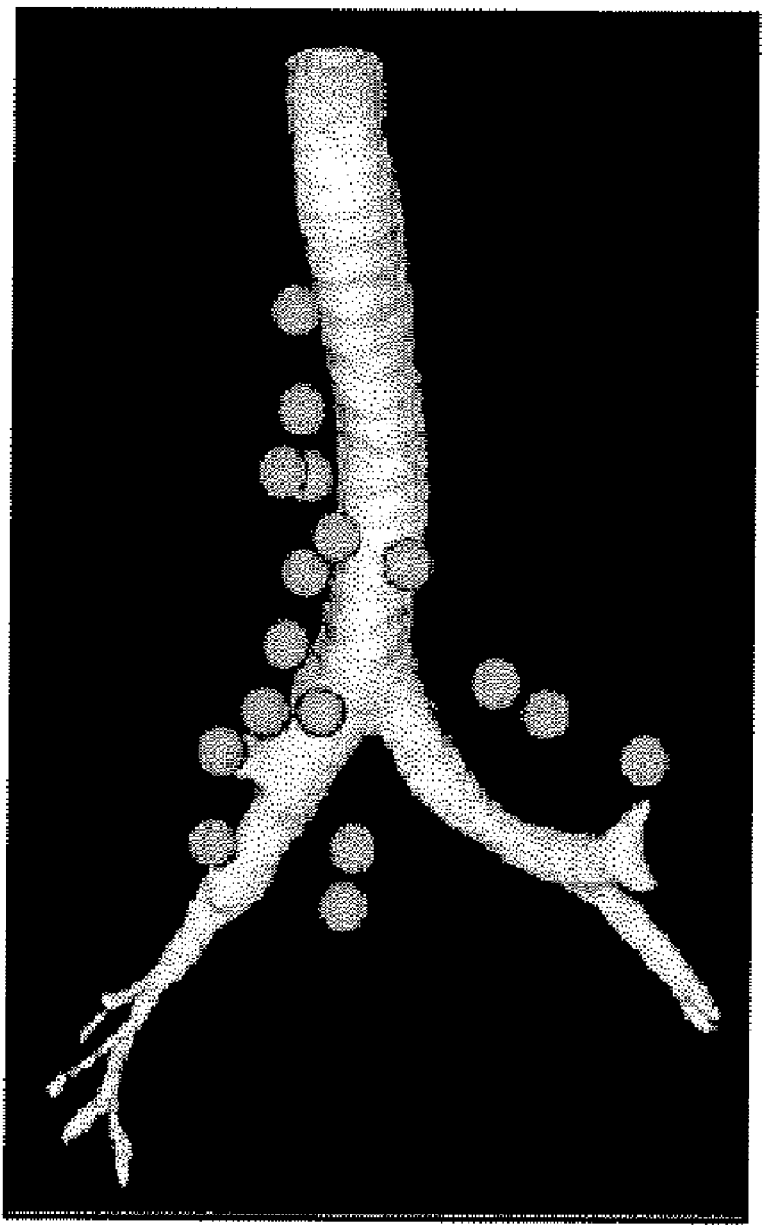
FIG. 2 illustrates a segmented airway tree along with identified lymph nodes.

In another embodiment of the present invention, the visualization of the landmarks in a 3D view can be used to enable the physician or operator to quickly determine the label. Although this is a manual procedure, it may be significantly faster than scrolling through 2D slices to determine a node's position relative to the major anatomical landmarks. A display similar to that shown in FIG. 2 can be shown to the user, thereby allowing a fast determination of nodal grouping. In essence, this process would put the radiologist in the position of making the classification, but with the added knowledge of instantly seeing the reference landmarks.

Closely related to this embodiment is the exploration of the most useful landmarks or features in an attempt to provide a more simple and effective criteria for labeling. Features and structures can be evaluated through the classifier to help eliminate unnecessary complexity. For example, one result obtained in the above-mentioned implementation shows that the angle of the location with the carina is one of the most useful features. Hence, other landmarks can be explored to quickly evaluate their effectiveness in determining the label. This result can then be applied to either the automatic method or the visualization method.

Yet another embodiment is to use the reverse of the mapping, e.g., given the label of a lymph node, determine the region of the volume where it should be located. This can be used to augment follow-up examinations where radiologists are required to examine a particular node or group of nodes. The proper region within the image volume can be immediately presented, thereby eliminating a navigational step from the workflow. This embodiment would also complement existing lymph node detection and segmentation methods by providing a limited region of interest within the image given a specific lymph node label.

FIG. 9 suggests how this embodiment would be accomplished. For example, as shown in FIG. 9, the regions are large since they represent nodal groups. Thus, regions for specific nodal stations are smaller and would be directly used to establish the region given to the radiologist or algorithm. Further, coupling this embodiment with an image registration method could allow the radiologist to locate the exact lymph node in the case of a follow up examination. A discussion of exemplary image registration techniques can be found in J. B. A. Maintz and M. A. Viergever, "A survey of medical image registration", Medical Image Analysis 2(1), pp. 1-36, 1998, a copy of which is incorporated by reference herein in its entirety. In this embodiment, only landmarks can be used for registration to reduce the complexity and time required for the image registration.

It should to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for assigning a lymph node in a medical image with an anatomical name, the method comprising:
   identifying landmarks in a medical image;
   receiving a location of a lymph node in the medical image;
   automatically computing features in spatial relation to the location of the lymph node, wherein the features are computed using the landmarks; and
   automatically assigning an anatomical name to the location of the lymph node by using a classifier that compares the computed features with classification rules,
   wherein the method is performed using a processor.

2. The method of claim 1, wherein the landmarks include centerlines of airways and a centerline of an aorta.

3. The method of claim 1, wherein the computed features include positional vectors of the lymph node relative to locations on the landmarks.

4. The method of claim 1, wherein the computed features include distance values of the lymph node relative to locations on the landmarks.

5. The method of claim 1, wherein the classifier is a trained Support Vector Machine (SVM) that includes a model having a set of anatomical names associated with locations in the medical image defining the classification rules.

6. The method of claim 1, further comprising:
   acquiring the medical image by using a computed tomographic (CT), magnetic resonance (MR), or ultrasound imaging technique.

7. The method of claim 1, wherein when assigning the anatomical name to the location of the lymph node biopsy-related information associated with the anatomical name is provided.

8. A system for assigning a lymph node in a medical image with an anatomical name, the system comprising:
   a memory device for storing a program;
   a processor in communication with the memory device, the processor operative with the program to:
   identify landmarks in a medical image;
   receive a location of a lymph node in the medical image;
   automatically compute features in spatial relation to the location of the lymph node, wherein the features are computed using the landmarks; and
   automatically assign an anatomical name to the location of the lymph node by using a classifier that compares the computed features with classification rules.

9. The system of claim 8, wherein the landmarks include centerlines of airways and a centerline of an aorta.

10. The system of claim 8, wherein the computed features include positional vectors of the lymph node relative to locations on the landmarks.

11. The system of claim 8, wherein the computed features include distance values of the lymph node relative to locations on the landmarks.

12. The system of claim 8, wherein the classifier is a trained Support Vector Machine (SVM) that includes a model having a set of anatomical names associated with locations in the medical image defining the classification rules.

13. The system of claim 8, wherein the processor is further operative with the program to:
   acquire the medical image by using a computed tomographic (CT), magnetic resonance (MR), or ultrasound imaging technique.

14. The system of claim 8, wherein when assigning the anatomical name to the location of the lymph node, the processor is further operative with the program to:
   provide biopsy-related information associated with the anatomical name.

15. A method for finding a region in a first medical image that contains a lymph node, the method comprising:
   identifying landmarks in a first medical image;
   receiving locations of lymph nodes within an area of the first medical image;
   automatically computing features in spatial relation to the locations, wherein the features are computed using the landmarks;
   automatically assigning the locations of the lymph nodes with anatomical names by using a classifier that compares the computed features with classification rules; and
   providing a region associated with a given anatomical name,
   wherein the method is performed using a processor.

16. The method of claim 15, wherein when a location and an anatomical name is obtained from the first medical image or a second medical image, the method further comprises:
   identifying landmarks in the second medical image
   performing a registration between the landmarks of the first and second medical images; and
   providing the location associated with the given anatomical name in the other of the first and second medical images.

17. The method of claim 15, wherein the area is a portion of the first medical image determined by defining a region of interest in the first medical image.

18. A method for assigning a lymph node in a medical image with a label, the method comprising:
   identifying landmarks in the medical image;
   receiving a location of a lymph node in the medical image;
   automatically computing features in spatial relation to the location of the lymph node, wherein the features are computed using the landmarks; and
   automatically assigning a label to the location of the lymph node by using a classifier that compares the computed features with classification rules,
   wherein the method is performed using a processor.

19. The method of claim 18, wherein the computed features comprise intensity values of the location of the lymph node or a model of lymph node within the medical image.

20. A method for assigning a lymph node in a medical image with an anatomical name, the method comprising:

identifying landmarks in a medical image;

receiving a location of a lymph node in the medical image;

automatically computing features in spatial relation to the location of the lymph node, wherein the features are computed using the landmarks; and automatically assigning an anatomical name to the location of the lymph node by using the computed features, wherein the method is performed using a processor.

* * * * *